United States Patent [19]
Keoshkerian et al.

[11] Patent Number: 5,714,993
[45] Date of Patent: Feb. 3, 1998

[54] INK JETTABLE TONER COMPOSITIONS AND PROCESSES FOR MAKING AND USING

[75] Inventors: Barkev Keoshkerian, Thornhill; Michael K. Georges, Guelph; Stephan V. Drappel, Toronto, all of Canada

[73] Assignee: Xerox Corporation, Stamford, Conn.

[21] Appl. No.: 646,867

[22] Filed: May 8, 1996

Related U.S. Application Data

[62] Division of Ser. No. 317,044, Oct. 3, 1994, Pat. No. 5,545,504.

[51] Int. Cl.$^6$ .................. G03G 9/13; B41J 2/01; B41J 2/17
[52] U.S. Cl. ............ 347/95; 347/102; 430/114; 430/115; 430/137
[58] Field of Search ............. 347/95, 102; 430/137, 430/114, 115

[56] References Cited

U.S. PATENT DOCUMENTS

| | | | |
|---|---|---|---|
| 4,003,312 | 1/1977 | Gunther et al. | 347/102 |
| 4,476,210 | 10/1984 | Croucher et al. | 430/114 |
| 4,599,291 | 7/1986 | Podszün et al. | 430/114 |
| 5,108,863 | 4/1992 | Hsieh et al. | 430/137 |
| 5,397,673 | 3/1995 | Watson et al. | 430/126 |
| 5,500,668 | 3/1996 | Malhotra et al. | 347/102 |
| 5,525,450 | 6/1996 | Spiewak et al. | 430/115 |
| 5,547,802 | 8/1996 | Kawase et al. | 430/110 |

*Primary Examiner*—Valerie Lund
*Attorney, Agent, or Firm*—John L. Haack

[57] ABSTRACT

A process for the preparation of toner compositions comprising: forming a mixture comprised of at least one free radical reactive monomer, a colorant, a stabilizer compound containing a stable free radical reactive group, and a liquid vehicle; and heating the mixture from about 75° to about 200° C. to effect polymerization of said monomer, wherein there results stabilized core resin particles containing said colorant and wherein said stabilized core particles are stabilized by said stable free radical reactive stabilizer compounds being bonded directly to the core particles.

17 Claims, 3 Drawing Sheets n (I—A—B)—SFR + Pigment Particles

↓ heat

Stabilized Pigment Particles

↓ monomer/resin, heat

Colorized Resin Particles n (I—A—B)—SFR + Pigment Particles

↓ heat

Stabilized Pigment Particles

↓ monomer/resin, heat

Colorized Resin Particles

*FIG. 3*

INK JETTABLE TONER COMPOSITIONS AND PROCESSES FOR MAKING AND USING

This is a division of application Ser. No. 08/317,044, filed Oct. 3, 1994 now U.S. Pat. No. 5,545,504.

CROSS REFERENCE TO COPENDING APPLICATIONS AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin comprised of a monomodal polymer resin or monomodal polymer resin blends and wherein the monomodal resin or resin blends possess a narrow polydispersity; and U.S. Pat. No. 5,145,518, issued Sep. 8, 1992, entitled "INKS CONTAINING BLOCK COPOLYMER MICELLES", wherein there is illustrated an ink composition which comprises an aqueous liquid vehicle and particles of an average diameter of 100 nanometers or less which comprise micelies of block copolymers of the formula ABA, wherein A represents a hydropholic segment and B represents a hydrophobic segment, and wherein dye molecules are covalently attached to the micelies, said dye molecules being detectable when exposed to radiation outside the visible wavelength range. Optionally, silica is precipitated within the micelies. In a specific embodiment, the ink also contains a colorant detectable in the visible wavelength range.

Attention is directed to commonly owned and assigned copending applications Application Numbers, U.S. Ser. No. 08/181,134, filed Jan. 4, 1994; U.S. Ser. No. 08/307,1920 filed Mar. 25, 1993; continuation-in-part of U.S. Ser. No. 07/976,604, filed Nov. 16, 1992, U.S. Ser. No. 08/214,518, filed Mar. 18, 1994, entitled "EMULSION POLYMERIZATION PROCESSES AND TONER COMPOSITIONS THEREFROM"; U.S. Ser. No. 08/223,418, filed Apr. 4, 1994, entitled "AQUEOUS POLYMERIZATION PROCESSES"; U.S. Ser. No. 08/242,490, filed May 13, 1994, entitled "ACRYLATE POLYMERIZATION PROCESSES"; and U.S. Ser. No. 08/254,728, filed Jun. 6, 1994, entitled "EMULSION POLYMERIZATION PROCESSES AND TONERS THEREOF".

The disclosures of the above mentioned patents and copending applications are incorporated herein by reference in their entirety.

BACKGROUND OF THE INVENTION

The present invention is generally directed to processes for the preparation of toner compositions and processes for using the toner composition in ink jet printing applications. More specifically, the present invention relates to processes which provide sterically and/or electrostatically stabilized in situ toner compositions and stabilized pigment particles which are suitable for use in electrophotographic imaging and ink jet printing methods. The present invention also relates to polymerization processes for preparing stabilized resin particle products that possess narrow molecular weight distributions or polydispersity properties and narrow particle size distributions, and which polymerization processes proceed with high monomer to polymer conversion. In particular, the present invention relates, in embodiments, to polymerization processes which directly yield stabilized resin particles having resin number average molecular weights ($M_n$) equal to or above about 2,000 to about 500,000 and having a polydispersity ratio of the weight average molecular weight ($M_w$) to the number average molecular weight ($M_n$) of from about 1.0 to about 2.0, and preferably about 1.1 to about 1.5. As used herein, the term "stabilized" refers to known electrostatic and/or steric solid-liquid or colloidal dispersion phenomena. The stabilized resin particles and stabilized pigment particles that are formed by in situ monomer polymerization reactions and pigment coupling reactions, respectively, in embodiments, may be used directly in selected liquid based imaging applications without the need for further processing steps, such as isolation, purification, classification, and the like. In other embodiments, the present invention provides processes for preparing stabilized pigment particles, which stabilization processes provide an alternative approach to conventional methods for stabilizing typically unstable pigment particle dispersions for use in, for example, aqueous and nonaqueous ink jet ink formulations. The present invention also provides, in embodiments, a pseudoliving polymerization process that enables the direct preparation of narrow polydispersity homopolymeric and copolymeric "reactive emulsifiers" which may be used to prepare stabilized resin particles directly from monomers; and stabilized pigment particles. In embodiments, first formed intermediate polymers, alternatively referred to as stabilizer compounds or reactive emulsifiers, are of the formula (I—A—B—)—SFR where I is a free radical initiator molecular fragment, A is a polymeric segment and B is a polymeric segment and which segments can be the same or different in composition and physical properties, and SFR represents a covalently bonded and thermally lablie latent stable free radical functional group. The intermediate polymers may be optionally isolated and stored indefinitely at ambient temperature or reacted directly, or in situ, with additional monomer or monomers to form stabilized resin or pigment particles. The processes of the present invention can, in embodiments, use known free radical initiators in combination with, for example, an oxygenated stable free radical agent, and a free radical reactive, polymerizable, monomer or monomers to afford stabilized, narrow polydispersity, homo- and copolymeric resin particles. The aforementioned resin particle formation and stabilization processes can optionally incorporate a colorant into the reaction mixture before, during, or after polymerization to provide particle coloration capability. In an alternative embodiment, the aforementioned stabilized pigment particles may be added to the aforementioned stabilized resin particle formation process to provide enhanced pigment dispersion and stability properties to the resulting pigmented resin particles or toner particles. Enhanced pigment dispersion and stability in toner particles in turn imparts desirable image quality characteristics to electrophotographic and liquid ink impressions and transparencies, particularly for color images, for example, high fidelity color reproduction and transparency projection efficiencies.

Conventional free radical polymerization processes that have been used to polymerize unsaturated or olefinic monomers inherently provide broad polydispersity resin products or require that sophisticated processing conditions and materials handling protocols be employed to control, to some extent, the polydispersity properties of the resin products, for example, carefully controlling reactor temperature profiles or monomer addition rates. The resin products prepared from the aforementioned conventional free radical polymerization processes generally require post reaction processing, such as isolation and purification, before the resin product is in a suitable condition for formulating with other components, such as colorants and charging additives, for the purpose of preparing dry or liquid toner particle formulations.

Many known polymerization processes used for the synthesis of narrow polydispersity resins, such as anionic, cationic, and group transfer polymerization processes, are severely limited by the need for anhydrous reaction conditions and monomers which do not contain protic or reactive functional groups, for example, hydroxy (OH) carboxy ($CO_2H$), amino (NH), and the like. As a consequence, these processes are not readily applicable to the polymerizaton of functionalized monomers since these monomer materials tend to be chemically reactive or hydroscopic whereby any associated water may readily destroy the polymerization initiator component, for example, the hydrolysis or protonation of organolithium reagents that are used in anionic polymerization processes, or in other ways cause the polymerization to fail entirely or to be industrially inefficient.

It is generally accepted that known anionic and cationic polymerization processes used for the preparation of narrow polydispersity resins, diblock and multiblock polymers are not believed possible in aqueous or protic solvent containing polymerization media, or in the presence of aforementioned protonic or reactive functional groups. Control of the polydispersity and blockedness of the resin enables control of toner melt rheology properties such as $T_g$ and hot offset temperature, reference, for example, the aforementioned U.S. Pat. No. 5,312,704.

Of the known polymerization processes a preferred way to prepare polymers or copolymers having a narrow molecular weight distribution or polydispersity is by anionic processes. The use and availability of resins having narrow polydispersities in industrial applications is limited because anionic polymerization processes must be performed in the absence of atmospheric oxygen and moisture, require difficult to handle and hazardous initiator reagents, and consequently such polymerization processes are generally limited to small batch reactors. In addition, the monomers and solvents that are used must be of high purity and anhydrous thereby rendering the anionic process more expensive and tedious than alternatives which do not have these requirements. Thus, anionic polymerization processes are difficult, costly and dangerous. It is desirable to have free radical polymerization process that provides narrow molecular weight distribution stabilized resin particles that overcomes the shortcomings and disadvantages of the aforementioned anionic and related polymerization processes.

Similarly, group transfer polymerization (GTP) processes have limitations and disadvantages, such as anhydrous reaction conditions and expensive reagents, which disadvantage GTP processes for large scale industrial applications.

Free radical polymerization processes are generally chemically less sensitive than anionic processes to impurities in the monomers or solvents typically used and are substantially or completely insensitive to water. There has been a long felt need for an economical free radical polymerization process which is suitable for directly preparing narrow polydispersity resins, stabilized resin and toner particles, and stabilized pigment particles by free radical reaction processes.

Copolymers prepared by conventional free radical polymerization processes inherently have broad molecular weight distributions or polydispersities, generally greater than about four. One reason is that most free radical initiators selected have half lives that are relatively long, from several minutes to many hours, and thus the polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating and polydispersity broadening reaction processes. In doing so, chains of varying lengths are terminated at different times during the reaction process which results in resins comprised of polymeric chains which vary widely in length from very small to very large and thus have broad polydispersities. If a free radical polymerization process is to be enabled for producing narrow molecular weight distributions, then all polymer chains must be initiated at about the same time and premature termination by coupling or disproportionation processes must be avoided or eliminated.

Contemporary environmental issues and pollution concerns are prompting greater use of certain biodegradable polymers, among these are water soluble polymers as described by F. Lo, J. Petchonka, J. Hanly, *Chem. Eng. Prog.*, July., 1993, p. 55–58, the disclosure of which is incorporated by reference herein in its entirety. In embodiments of the present invention are provided water soluble and biodegradable polymeric resins.

Conventional processes for preparing sterically and/or electrostatically stabilized resin or sterically stabilized pigment particles are confounded by the aforementioned problems of anionic and cationic processes which require scrupulously dry solvents and reactants, and monomer compounds without reactive functionality. Other stabilization processes known in the art use oxygenated polymeric compounds, such as polysaccarides, as macromolecular steric stabilizers. These stabilizer compounds are either physi-sorbed or physically embedded into the surface of the resin or toner particles. Covalent attachment of these and other stabilizer compounds to the particle surface has proven to be a difficult and expensive proposition. Oxygenated polymeric steric stabilizer compounds typically render the resulting particles humidity sensitive thereby making the resultant stabilized dry toner particles and developer compositions also humidity sensitive.

The following patents are of interest, the disclosures of which are incorporated by reference herein in their entirety:

In U.S. Pat. No. 5,728,239, to Hoxmeier, issued Jan. 11, 1994, there is disclosed a process for producing a coupled polymer by anionically polymerizing monomers selected from the group consisting of a vinyl aromatic hydrocarbon, a conjugated diene or both with an organo alkali metal compound to produce living polymers. The living polymers are then contacted with a fullerene which form a multiply coupled polymerfullerene adduct. The coupled polymerfullerene adduct has a novel composition and novel characteristics.

U.S. Pat. No. 4,597,794, to Ohta et al., issued Jul. 1, 1986, discloses an ink-jet recording process which comprises forming droplets of an ink and recording on an image receiving material by using the droplets, said ink is prepared by dispersing fine particles of pigment in an aqueous dispersion medium containing polymer having both a hydrophilic and a hydrophobic construction portion. An average particle size (D micron) of the pigment and an average molecular weight of the polymer satisfy the relationship represented by the equation $D \times 5 \times 10^2 < W$, and the ratio of molecular weight of the pigment to average molecular weight of the polymer is a value in the range from 1:2 to 1:150.

U.S. Pat. No. 4,846,893, to Akasaki, issued Jul. 11, 1989, discloses a process for producing a surface treated pigment wherein pigment particles are dispersed in a solution of a water soluble high polymer having radical generation sites to absorb the water soluble high polymer on the surfaces of the pigment particles, adding vinyl monomer to the resulting aqueous liquid dispersion of the pigment particles subjected to the adsorption treatment and polymerizing in the presence of a polymerization initiator, if desired, to form a polymer layer on the surfaces of the pigment particles. Formation of the white polymer particles composed only of polymer can be prevented and dispersion stability can be improved.

U.S. Pat. No. 4,476,210 to Croucher et al., issued Oct. 9, 1984, discloses a stable colored liquid developer and method for making such are described wherein an improved optical density resulting from a colored dye being imbibed into a thermoplastic resin core occurs. In particular, the liquid developer comprises a marking particle dispersed in an aliphatic dispersion medium, the marking particle comprises a thermoplastic resin core having an amphipathic block or graft copolymeric steric stabilizer irreversibly chemically or physically anchored to the thermoplastic resin core with the dye being imbibed in the resin core and being soluble therein and insoluble in the dispersion medium. The stable colored liquid developer is preferably made by first preparing a graft or block copolymer amphipathic steric stabilizer, anchoring said stabilizer to a thermoplastic resin core, and to the aliphatic dispersion of said particle adding a solution of a dye dissolved in a polar solvent, preferrably methanol, the dye being soluble in the thermoplastic resin core to enable it to be imbibed therein and substantially insoluble in the dispersion medium.

U.S. Pat. No. 5,281,261, to Lin, issued Jan. 25, 1994, discloses an ink composition comprising an aqueous liquid vehicle and pigment particles having attached to the surfaces thereof a polymerized vinyl aromatic salt. In one embodiment, the polymeric vinyl aromatic salt is chemically grafted to the surfaces of the pigment particles; in another embodiment, the polymeric vinyl aromatic salt is adsorbed onto the surfaces of the pigment particles. Preferably, the modified pigment particles have an average particle diameter of less than about 1 micron. The ink composition is suitable for applications such as ink jet printing processes, particularly thermal ink jet printing processes. Images generated with ink compositions of the disclosed invention are sharp, waterfast, lightfast, and of high optical density, exhibiting no feathering, and can be electrically conductive.

U.S. Pat. No. 4,530,961 to Nguyen et al., issued Jul. 23, 1985, discloses an aqueous dispersion of carbon black grafted with hydrophilic monomers such as alkali or ammonium carboxylate bearing polymers. The dispersion has a viscosity of about 2 to about 30 cP for a carbon black content of about 1 to 15 percent by weight.

U.S. Pat. No. 4,314,931 to Hoffend et al., issued Feb. 9, 1982, discloses a process for substantially eliminating polymerization inhibition in a pigment containing dispersion polymerizaton reaction, which comprises grafting polymer molecules onto the pigment used in the polymerizaton reaction, whereby there results a polymerized product which contains essentially no monomer material.

U.S. Pat. 4,581,429, to Solomon et al., issued Apr. 8, 1986, discloses a free radical pseudoliving polymerization process which controls the growth of polymer chains to produce short chain or oligomeric homopolymers and copolymers including block and graft copolymers. The process employs an initiator having the formula (in part) =N—O—X, where X is a free radical species capable of polymerizing unsaturated monomers. The working examples of this patent illustrate low monomer to polymer conversion, and in some instances, the polydispersity is reported as 1.15, see Example 34. All of the polymerization Examples of this patent are to be reviewed with respect to the present invention.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

The following references are also of interest: U.S. Pat. Nos. 2,913,429; 2,971,935; 3,306,871; 3,682,875; 3,879,360; 3,954,722; 4,201,848; 4,524,199; 4,542,182; 4,581,429; 4,652,508; 4,777,230; 4,816,370; 5,059,657; 5,173,551; 5,191,008; 5,191,009; 5,194,496; 5,216,096; 5,247,024; 5,268,437; 4,546,160; and 4,736,004; U.K. Pat. 895,033; and German Patent 1,051,501.

Other references cited in an international search report for the aforementioned U.S. Pat. No. 5,322,912 are: *J. Am. Chem. Soc.*, 1983, 5706–5708; *Macromol.*, 1987, 1473–1488; *Macromol.*, 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976.

In free radical polymerization reaction processes of the prior art, various significant problems exist, for example difficulties in predicting or controlling both the polydispersity and modality of the polymers produced. These processes generally produce polymers with high weight average molecular weights ($M_w$) and low number average molecular weights ($M_n$) resulting in broad polydispersities or low molecular weight ($M_n$) and in some instances low conversion. The Solomon patent, reference the examples, see especially Examples 34A and 34B, illustrates narrow polydispersities of the example 1.15, however the conversion is low, less than about 22% for example, and this process utilizes a reaction adduct or product of a carbon centered free radical and a stable free radical to initiate polymerization. Further, generally the free radical polymerization processes of the prior art are prone to generating excessive quantities of heat since the polymerization reaction is exothermic. As the viscosity of the reaction medium increases, dissipation of heat becomes more difficult. This is referred to as the Trommsdorff effect as discussed and illustrated in *Principles of Polymerization*, G. Odian, 2nd Ed., Wiley-Interscience, New York, 1981, page 272, the disclosure of which is entirely incorporated herein by reference. This is particularly the situation for reactions with high concentrations of soluble monomer, for example greater than 30 to 50 percent by weight soluble monomer, which are conducted in large scale reactors with limited surface area and limited heat dissipation capacity. Moreover, the exothermic nature of free radical polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying, dissolving, and manipulating the product resin, particularly for highly concentrated reactions.

These and other disadvantages are avoided, or minimized with the free radical polymerization, stabilization, and derivatization processes of the present invention.

Practitioners in the art have long sought an inexpensive, efficient and environmentally efficacious means for preparing stabilized resin and pigment particles, and which stabilized particles are suitable for use in preparing dry and liquid developer compositions and imaging processes.

Thus, there remains a need for polymerization processes for the preparation of narrow polydispersity reactive emulsifier compounds and polymeric resins, and for derivatization processes for preparing stabilized resin and pigment particles by economical and scalable free radical polymerization techniques and which polymers and particles retain many or all of their desirable physical properties, for example, hardness, low gel content, processability, clarity, high gloss durability, and the like, while avoiding problems such as gel formation, exothermss, volume limited and multi-stage reaction systems, purification, performance properties of the polymer resin products, and the like, associated with prior art free radical polymerization and particle stabilization methodologies.

The present invention provides intermediate product polymers containing a latent, thermally reactive, functional group on at least one end of the polymer molecule which are subsequently used in reactions to prepare resin particles with desired resin architectures, particle size, and colloidal stability properties. The present invention, in embodiments, provides polymerization processes that enable control of resin molecular weight, weight distribution, modality and homogenity of the products, and the like properties.

The present invention is also directed to pseudoliving polymerization processes which permit the economic preparation of narrow polydispersity resins with low, intermediate, or high molecular weights. The low molecular weight resins can be prepared without a chain transfer agent or molecular weight modifier which provides several advantages over conventional chain transfer mediated polymerization processes.

The polymerization processes, thermoplastic resin products, and stabilized resin and pigment particle formulations of the present invention are useful in many applications, for example, specialty applications including toner, liquid immersion development ink resin particles, and ink jet inks and performance additives for electrophotographic and non-electrophotographic imaging processes.

SUMMARY OF THE INVENTION

An object of the present invention is to provide polymerization processes and polymers and stabilized particles therefrom that overcome many of the problems and disadvantages of the aforementioned prior art.

In another object of the present invention is provided polymerization processes for the preparation of diblock and multiblock reactive emulsifiers or reactive stabilizer compounds.

It is also an object of the present invention to provide polymerization processes for the production of diblock and multiblock resins and thermally lablie, free radical reactive, emulsifiers having narrow molecular weight polydispersity properties and with high monomer to polymer conversion.

It is a further object of the present invention to provide pigment stabilization processes which embody the direct reaction of the aforementioned thermally lablie reactive emulsifier or stabilizer compounds with pigment particles, such as carbon black, to provide surface modified and dispersion stabilized pigment particles.

In another object of the present invention is provided, in embodiments, a polymerization process for the preparation of stabilized thermoplastic resins and toner resin particles comprising forming a mixture comprised of at least one free radical reactive monomer, a colorant, a stabilizer compound containing a thermally lablie and covalently bound stable free radical reactive group, an optional emulsifier, and an optional polymeric resin wherein the optional resin is soluble or dispersible within the monomer, and a liquid vehicle; and heating the mixture to effect polymerization of the monomer, wherein there results stabilized core resin particles containing the colorant and wherein the stabilized core particles are stabilized by the covalently appended stable free radical and stable free radical reactive stabilizer compound fragments. In embodiments of forming the aforementioned reactive stabilizer compound, it is important that the free radical initiator and stable free radical agent be added as separate components and wherein a reaction therebetween is avoided.

Another object of this invention is to provide processes for the preparation of sterically and/or electrostatically stabilized resin particles which stabilized particles can be subsequently thermally destabilized or otherwise surface modified by additional stable free radical mediated chemical reactions, for example, adding additional monomer and heating to provide surface hydrophobicity altered particles.

Another object of the present invention is to provide a polymerization reaction system which affords ink jettable toner particles, that is a thermal ink jet ink composition which is thermally stable prior to jetting and may be subsequently readily jetted by known means and then fixed to a receiver member by thermal, irradiation, or pressure means at about 25° C. to about 150° C.

Another object of the present invention is to provide a polymerization reaction system which may be conducted in the presence of conventional free radical polymerization inhibiting pigments such as carbon black.

Still another object of the present invention is to prepare water soluble or water dispersible thermoplastic resin particles by single pot processes employing suitable monomer or monomers, free radical initiator, optional minimal amounts of an emulsifier or surfactant which may provide rate enhancement or simplify isolation, but avoids emulsification or phase separation during the polymerization, and a stable free radical agent.

In yet another object of the present invention there are provided an imaging method and ink jet compositions for producing fused images which possess desirable latency, recoverability, kogation, mid frequency line edge noise (MFLEN) or edge raggedness, high resolution of from about 300 to about 600 spots per inch, colorfastness, water fastness, reduced spattering, and dispersion stability.

Another object of the present invention is to prepare resins and stabilized resin particles using polymerization processes wherein the molecular weight of the growing polymer or copolymer chains increase over the entire time period of the polymerization reaction and wherein the percent conversion or degree of polymerization of monomer to polymer with respect to time or number average molecular weight is approximately linear, that is, polymerization processes which occur without the aforementioned Trommsdorff effect.

In other embodiments the polymerization processes of the present invention can be used to prepare reactive emulsifiers or stabilizer compounds that comprise diblock copolymers or multi-block polymers with narrow polydispersity properties wherein at least one of the blocks is water soluble and subsequently added blocks or segments may be partially or entirely water insoluble and wherein the polymer contains a covalently bonded and thermally lablie stable free radical functional group thereby providing a means for preparing surfactant materials with well defined polydispersity and hydrophobe-lipophobe balance (HLB) properties and containing a latent or masked free radical terminal functional group which is capable of further free radical addition polymerization reactions or coupling reactions.

The processes of the present invention, in embodiments, comprise a means for the direct preparation of stabilized dry and liquid toner particle compositions and stabilized pigment particles which are suitable for use in electrophotographic and ink jet imaging and printing applications, including color processes. The stabilizer molecules or reactive emulsifiers and the polymer resins produced by processes of the present invention, in embodiments, are essentially monomodal, that is the molecular weight distribution is narrow and indicative of a Poisson character and without substantial shoulders or side bands.

In embodiments, by repeating the heating step, comprising the combined initiation and polymerization step, there is provided a means for obtaining monomodal mixtures of polymer resins that are compositionally the same resin type with characteristics of both narrow polydispersity and known or selectable modality greater than 1.

Moreover, in embodiments, the process of the present invention provides a means for conducting polymerization processes on multikilogram or larger scales. The aforementioned embodiments may be accomplished in a one or single pot reactor environment. In embodiments, polymeric chain growth proceeds by a pseudoliving mechanism and can provide resins of desired weight average molecular weights from very low to very high, for example, less than about 2,000 to in excess of about 500,000, for example, up to about 700,000, while maintaining reasonably narrow molecular weight distributions or polydispersities.

Further, in embodiments, the processes of the present invention provide an efficient means for preparing high molecular weight, for example, in excess of about 250,000 to about 500,000 weight average molecular weight polymeric resins, comprising preparing and isolating a stable free radical terminated reactive emulsifier compound with a weight average molecular weight of about 10,000 to about 50,000 and preferably about 30,000 in accordance with the aforementioned stable free radical polymerization processes and thereafter reacting the isolated reactive emulsifier compound with appropriate amounts of additional monomer. The resulting stable free radical terminated polymer possesses substantially higher molecular weight properties; is substantially purier; and is obtained in substantially less time, that is shorter reaction times for a given temperature range, than the corresponding de novo polymerization processes. A concomitant advantage of the aforementioned two stage reaction process is the ability to conduct particle formation and stabilization processes of the present invention at higher solids levels or concentrations, for example, at about 10 to about 50 weight percent solids and above.

In embodiments, the block and multiblock copolymers of the aforementioned stabilizer compounds or reactive emulsifier can be prepared by the aforementioned stable free radical moderated polymerization processes wherein each block formed is well defined in length by the sequentially added and reacted monomer and wherein each additional block that is formed also possesses a narrow molecular weight distribution.

Other objects of this invention will be apparent to those skilled in the art in light of the present disclosure and appended claims.

BRIEF DESCRIPTION OF THE DRAWINGS

FIG. 3 illustrates an exemplary scheme for preparing stabilized pigment and resin particles of the present invention.

DETAILED DESCRIPTION OF THE INVENTION

Figure 1:
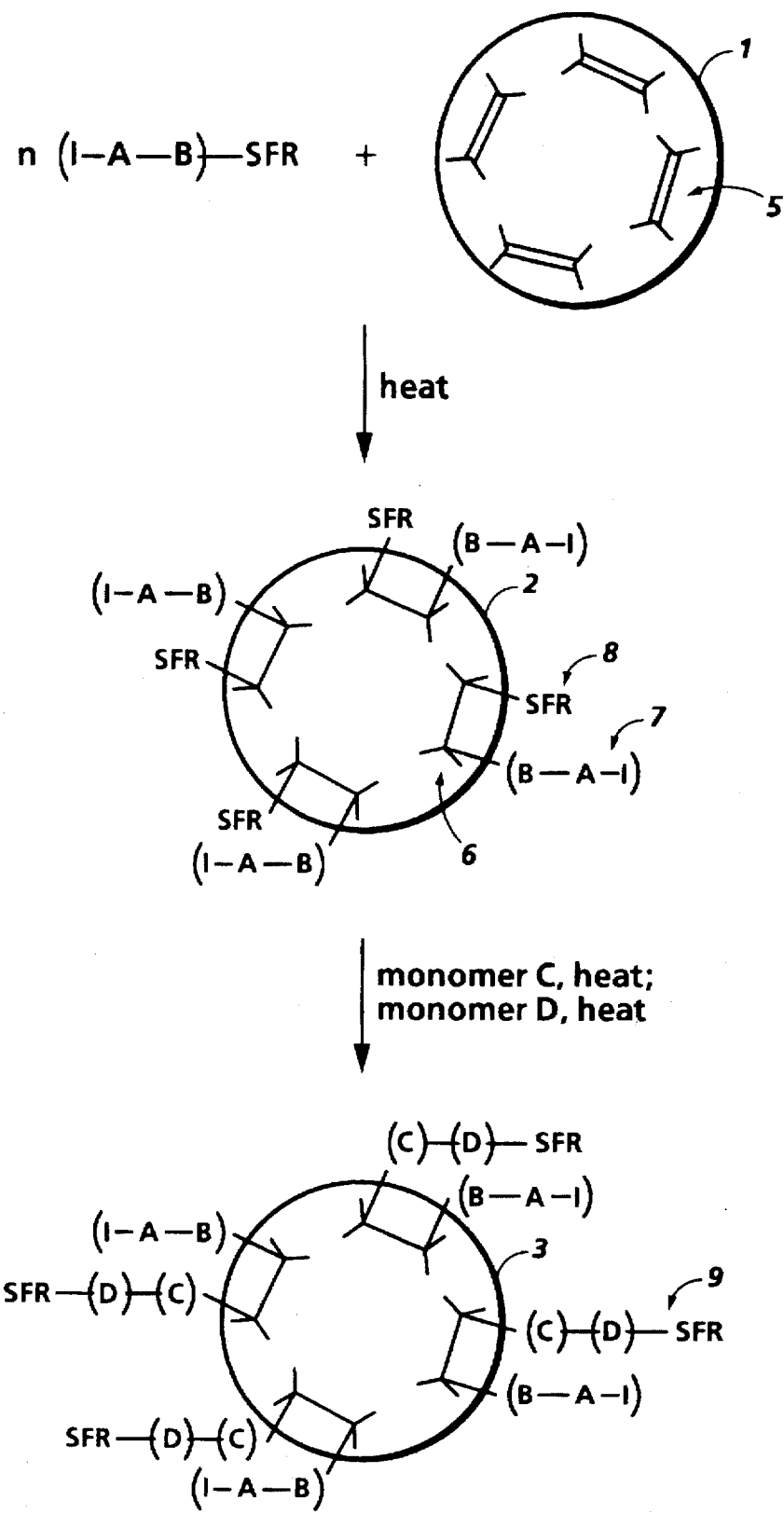
FIG. 1 illustrates an exemplary scheme for preparing stabilized resin particles of the present invention using reactions of a reactive emulsifier and a preformed resin particle having free radical reactive sites on or at the resin particle surface.

The present invention provides polymerization processes for preparing stabilized polymeric resin particles with well defined molecular weight properties and narrow polydispersities. The present invention provides processes which are also applicable to the preparation of stabilized pigment particles. The processes can be performed as batch, semicontinuous or continuous processes. The processes provide for from about 5 to about 99 percent by weight of the reaction mixture to be monomer or monomer mixtures and the processes are conducted at from about 100° C. to about 180° C. and preferably from about 120° C. to about 140° C. The processes produce polymer products and stabilized particles having low, intermediate, or high molecular weights; and narrow resin and stabilizer compound polydispersities.

In embodiments, the present invention overcomes the problems and disadvantages of the prior art polymerization processes by forming narrow, for example, about 1.1 to about 1.8, preferably about 1.1 to about 1.5, and most preferably about 1.1 to about 1.3, polydispersity polymeric resins by means of, for example, a single pot polymerization process for the preparation of stabilized thermoplastic resin or resins comprising heating a mixture comprised of a free radical initiator, a stable free radical agent, at least one polymerizable free radical reactive monomer compound, and optionally a solvent, to form a stabilized thermoplastic resin or resins with a high monomer to polymer conversion and a narrow polydispersity. The resulting stabilized thermoplastic resins may be the aforementioned intermediate polymer products which are useful as reactive emulsifiers or may be the aforementioned stabilized resin particles depending on the process procedures and conditions selected and as illustrated herein.

In embodiments, the present invention provides a polymerization process for the preparation of stabilized thermoplastic resin or resins particles for use as, for example, toners comprising forming a mixture comprised of at least one free radical reactive monomer, a colorant, a steric and/or electrostatic stabilizer compound containing a stable free radical reactive group, an optional emulsifier, and an optional polymeric resin wherein the optional resin is soluble or dispersible within said monomer, and a liquid vehicle; and heating the mixture to effect polymerization of said monomer, wherein there results stabilized core resin particles containing said colorant and wherein said stabilized core particles are stabilized by said stable free radical reactive stabilizer compound covalently bound thereto.

In embodiments, the processes of the present invention can be expanded to enable the formation of bimodal or multimodal thermoplastic resins by for example, adding to the aforementioned thermoplastic resin or resins a second mixture comprised of a free radical initiator, a stable free radical agent, and at least one polymerizable monomer compound as disclosed in the aforementioned Copending Application U.S. Ser. No. 08/242,490. The resulting mixture of thermoplastic resins possesses a modality of 2. Higher modalities, for example, of from 3 to about 20 can be conveniently achieved, if desired, by the subsequent addition of additional fresh mixtures of monomer, free radical initiator, and stable free radical agent prior to a final cooling and isolation step. The resulting resins in embodiments can be, for example, a bimodal mixture of a first homopolymer product resin comprising a diblock copolymer comprised of a first segment containing a block derived from a first monomer and a second block arising from the second monomer mixture, and a second product resin comprised of a homopolymer derived from substantially only the second monomer mixture.

There is additionally provided a method of imaging comprising: jetting with a liquid jetting means an ink jettable toner composition comprised of a liquid carrier vehicle and stabilized core particles comprised of resin, colorant, and a stabilizer component, in a predetermined pattern onto a receiving member to form an image; and fixing the image to a receiver by heating or irradiating the image and/or the receiver at from about 40° to about 150° C. so that a durable and high quality image results therefrom.

In embodiments of the present invention, there are provided a toner composition comprising a liquid carrier vehicle, and marking particles comprised of a core resin or resins, a colorant, optional additives, and at least one stable free radical reactive polymeric stabilizer compound, which is substantially covalently attached to the resin particle surface or embedded in the resin particle core, that is a composition wherein the stable free radical reactive stabilizer compound is substantially chemically bound or covalently attached to the core resin, wherein for example, a hydrophobic end of the stabilizer compound is substantially embedded in the hydrophobic core resin particles. Also disclosed are compositions wherein the stable free radical reactive stabilizer compound is a block copolymer of the formula (A—B—)—SFR or (I—A—B)—SFR wherein A is a hydrophilic polymer or copolymer segment, B is a hydrophobic polymer or copolymer segment, I represents a free radical initiator reactant residue and wherein —SFR is a terminal and thermally lablie latent stable free radical functional group covalently bonded to the B segment. Also disclosed are compositions and processes wherein the stable free radical block copolymer compound of the formula (A—B)—SFR or (I—A—B)—SFR when heated in the presence of core resin monomer affords a stabilized marking particle of the formula (A—B)$_n$—C where C represents the core polymer resin, (A—B) represents the stabilizer adduct bound directly to the core polymer resin via the hydrophobic block segment B, and wherein n is an integer from 1 to about $10^7$ or alternatively up to about 15 percent by weight of stabilizer compound to the total weight of the core resin and represents the number of polymeric stabilizer groups derived from the SFR reactive stabilizer compound which are bonded to the core polymer resin. From the foregoing discussion and the disclosure and working examples contained hereinafter it is readily apparent, and understood by one of ordinary skill in the art, that the free radical initiator reactant, fragment, or residue designated as I in the formula (I—A—B)—SFR is embodied in the alternative formula representation (A—B)—SFR.

There are also provided ink compositions comprising an aqueous liquid vehicle and marking particles with an average volume diameter of about 0.3 to about 10 microns comprised of at least one polymeric or copolymeric resin, a colorant, optional additives, and at least one polymeric or copolymeric stabilizer compound wherein the stabilizer compound is a block copolymer with a hydrophilic segment and a hydrophobic segment and wherein the hydrophobic segment is covalently attached to and embedded in the core polymer resin particles.

Embodiments of the present invention are directed to processes for the preparation of toner compositions comprising: heating a mixture of at least one free radical reactive pigment particle and a stabilizer compound of the aforementioned formula (I—A—B)—SFR containing a covalently bonded and thermally lablie latent stable free radical reactive group to afford stabilized pigment particles, wherein the stabilized pigment particle has at least one stabilizer compound bonded directly thereto; dispersing and then heating the stabilized pigment particles and at least one free radical reactive monomer in a suspending liquid vehicle to form stabilized and pigmented resin particles wherein the stabilized pigment particles provide a loci and source of pseudoliving free radical species which polymerize the free radical reactive monomers thereon and stabilize the product against agglomeration or precipitation while in the suspending liquid vehicle.

The amount of stabilizer compound relative to the pigment used is selected to provide the desired level of stability to the resultant stabilizer-pigment adduct, for example, up to about 10 to 15 weight percent of the stabilizer compound based on the weight of the pigment particles.

One class of monomers suitable for use in the present invention is $C_3$–$C_6$ monoethylenically unsaturated monocarboxylic acids, and known alkali metal and ammonium salts thereof. The $C_3$–$C_6$ monoethylenically unsaturated monocarboxylic acids include acrylic acid, methacrylic acid, crotonic acid, vinylacetic acid, and acryloxypropionic acid. Acrylic acid and methacrylic acid are the preferred monoethylenically unsaturated monocarboxylic acid monomers.

Another class of monomers suitable for the present invention is $C_4$–$C_6$ monoethylenically unsaturated dicarboxylic acids and the known alkali metal and ammonium salts thereof, and the anhydrides of the cis dicarboxylic acids. Suitable examples include maleic acid, maleic anhydride, itaconic acid, mesaconic acid, fumaric acid, and citraconic acid. Maleic anhydride and itaconic acid are preferred monoethylenically unsaturated dicarboxylic acid monomers.

The acid monomers selected may be in their acid forms or in the form of the alkali metal or ammonium salts of the acid. Suitable bases useful for neutralizing the monomer acids include sodium hydroxide, ammonium hydroxide, potassium hydroxide, and the like. The acid monomers may be neutralized to a level of from 0 to 50 percent and preferably from 0 to about 20 percent. More preferably, the carboxylic acid monomers are used in the completely neutralized form, that is, for example, wherein the carboxylic acid functional groups (—$CO_2H$) are completely converted using stoichiometric or excess molar amounts of the appropriate base to corresponding carboxylate salts (—$CO_2M$) where M is an alkali metal or ammonium salt selected from the group of Li, Na, K, Rb, $NR_4$, where R is selected from the group of hydrogen, alkyl, alkenyl, alkylaryl, and aryl having from 0 to 20 carbon atoms, and the like counter ions.

Polymerizable monomers include monoethylenically unsaturated carboxylic acid-free monomers. Suitable monoethylenically unsaturated carboxylic acid-free monomers can be copolymerizable with the carboxylic monomers. Typical monoethylenically unsaturated carboxylic acid-free monomers which are suitable for this invention include alkyl esters of acrylic or methacrylic acids such as methyl acrylate, ethyl acrylate, butyl acrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, dimethylaminoethyl acrylate, dimethylaminoethyl methacrylate, phosphoethyl methacrylate, N-vinylpyrrolidone, N-vinylformamide, N-vinylimidazole, vinyl acetate, styrene, hydroxylated styrenes, styrenesulfonic acid and salts thereof, vinylsulfonic acid and salts thereof, 2-acrylamido-2-methylpropane-sulfonic acid and salts thereof, and dially dialkyl quaternary ammonium salts.

Other suitable comonomers include acrylamides, alkyl and aryl amide derivatives thereof, and quaternized alkyl and aryl acrylamide derivatives.

Monomers, polymers and copolymers of the present invention can, in embodiments, be separated from one another or from the polymerization reaction mixture by, for example, solvent precipitation cooling, changing the pH of the reaction media, for example, from about 7 to about 4, and other well known conventional separation techniques.

The aforementioned monomers and comonomers can be used in polymerization reactions in amounts from 5 to 95 weight percent of the total weight of reactants.

Examples of suitable initiators selected for the processes of the present invention include any conventional free radical initiators which have a half-life of, for example, at least 1 second at the polymerization temperature. Preferably, the initiator will have a half life of from about 10 second to about 2 hours, more preferably from about 10 seconds to about 10 minutes at the reaction temperature. In another embodiment, a preferred heating profile is as follows: the initiator is added to the reaction mixture and then heated to about 80° to about 90° C. from about 5 minutes to about 5 hours, and preferably from about 30 minutes to about 2 hours, to effect complete reaction of the initiator with the monomer(s), and then heating at about 120° to about 140° C. for about 1 to about 20 hours to complete the polymerization of the monomer(s). These initiators include oxygen, hydrogen peroxide, certain alkyl hydroperoxides, diallcyl peroxides, peresters, percarbonates, peroxides, persulfates and azo initiators. Specific examples of some suitable initiators include hydrogen peroxide, t-butyl hydroperoxide, di-tertiary butyl peroxide, tertiary-amyl hydroperoxide, potassium persulfate, and methylethyl ketone peroxide. The initiators are normally selected in amounts of from about 0.05 percent to about 33 percent based on the weight of total polymerizable monomer. A preferred range for preparing low glass transition temperature resin particles is from about 0.5 to about 20 percent by weight of the total polymerizable monomer. When the initiators are selected in amounts of about 0.001 to about 0.005 weight percent, weight average molecular weights in excess of about 500,000 to about 700,000 of the resulting polymeric particles can be obtained. In a preferred embodiment, an intermediate molecular weight stable free radical terminated stabilizer compound is first formed and then added to a second mixture containing additional monomer with the result that higher molecular weight polymers with narrow polydispersity may be achieved.

Redox initiators may also be used. These initiators include, but are not limited to, sodium bisulfite, sodium sulfite, isoascorbic acid, sodium formaldehyde-sulfoxylate, and the like, used with suitable oxidizing agents, such as the thermal initiators noted above. When selected, the redox initiators may be added in amounts of 0.05 percent to 16 percent, based on the weight of total monomer. A preferred range is from about 0.5 to about 5 percent by weight of total monomer. Many of these initiators introduce salt by-products into the aqueous polymer product. It is preferred that the level of these initiators, if used, be minimized.

The stable free radical selected may be any known stable free radical agent which enables the objects of the present invention to be achieved. The aforementioned copending applications and commonly assigned patents disclose various stable free radical agents. Examples of stable free radical compounds which are suitable for use in moderating the polymerization of free radical reactive monomers include: 2,2,6,6-tetramethy-1-piperidinyloxy free radical (TEMPO); 4-hydroxy-2,2,6,6-tetramethy-1-piperidinylxoy free radical; 2,2,5,5-tetramethyl-1-pyrrolidinlyoxy; 3-carboxy-2,2,5,5-tetramethyl-1-pyrrolidinyloxy; and ditertbutyl nitroxide. The aforementioned stable free radicals and related derivatives, are satisfactory for the purpose of moderating the polymerization of a wide variety of different monomer types and comonomers, but are completely ineffective when used in homopolymerizations of acrylate monomers. The carbonyl containing stable free radical 4-oxo-2,2,6,6-tetramethyl-1-piperidinyloxy, (4-oxo-TEMPO) is effective for forming acrylate homopolymers and homopolymeric acrylate containing thermoplastic polymers. The stable free radical agents are selected in amounts of from 0.05 to about 35 percent based on the weight of the weight of the total polymerizable monomer. A preferred range is from about 0.5 to about 25 percent by weight of the total polymerizable monomer, and is used in approximately equivalent molar amounts, or preferrably, in slight molar excess amounts of the free radical initiator selected.

Stable free radical compounds are known, reference for example U.S. Pat. Nos. 5,264,204 and 5,179,218, and a number of other suitable stable free radical compounds are available commercially and are readily accessible synthetically, for example, as disclosed in "Synthetic Chemistry of Stable Nitroxides", by L. B. Volodarsky et al., CRC Press, 1993, ISBN:0-8493-4590-1. The disclosures of the above-mentioned references are incorporated by reference herein in their entirety.

The monomers of the present invention can be polymerized in a variety of polymerization reaction media. The reaction mixture may contain from about 95 to about 98 percent by weight, preferably from about 20 to about 90 percent by weight, and most preferably from 25 to about 85 percent by weight free radical reactive monomer with the balance comprised of other reactants, reagents, comonomers, colorants, and optional solvents or diluents.

The polymerization reactions of the present invention can be supplemented with a solvent or cosolvent to assist in ensuring that the reaction mixture remains a homogeneous single phase throughout the monomer conversion if desired. Any solvent or cosolvent may be selected providing that the solvent media is effective in permitting a solvent system which avoids precipitation or phase separation of the reactants or polymer products until after all polymerization reactions have been completed. The reaction solvent may be the same or different from the solvent selected as the liquid vehicle depending on the properties desired in the resulting formulation, for example, evaporation rates or volitility, monomer solubility, and the like. Exemplary solvent or cosolvents useful in the present invention may be selected from the group consisting of water, polymer product compatible solvents or non-solvents, that is solvents which dissolve or readily disperse the polymer product, aliphatic alcohols, glycols, ethers, glycol ethers, pyrrolidines, N-allcyl pyrrolidinones, N-allcyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL® or CELLOSOLVE®, amino alcohols, Icetones, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

Temperature of the polymerization may range from about 75° C. to about 180° C., preferably from about 110° C. to about 175° C. and more preferably from about 120° C. to about 140° C. At temperatures below about 100° C., the reaction rate is slow and industrially impractical without the aid of an acid or base accelerating additive compound. At temperatures above about 180° C., conversion of the monomer into polymer decreases and uncertain and undesirable by-products are formed. Frequently, these by-products discolor the polymer mixture and may necessitate a purification step to remove them or they may be intractable.

Since solvent and cosolvent admixtures can be used as the reaction media, the elevated temperatures of the polymerization preferably select a polymerization reactor that is equipped to operate at elevated pressure. In general, it is preferred to conduct the polymerization at from about 10 to about 2,000 pounds per square inch (psi), and more preferably at from about 50 to about 1,000 psi.

The weight average molecular weights referred to herein are measured by gel permeation chromatography using, for example, a polyethylene oxide standards for water soluble polymers and polystyrene standards for organic soluble polymers unless specifically stated otherwise.

Although not being desired to be limited by theory, it is believed that when polymerization reaction processes of the present invention are performed at a temperature at about or above 100° C., the exact temperature depending on the initiator used, all the polymer chains are expected to be initiated at about the same time. This is believed to be an important feature in forming polymer chain products and resin particles having high molecular weights and narrow polydispersities.

The aforementioned undesirable chain coupling or disproportionation termination reactions, so prevalent under the conditions of conventional art free radical polymerization systems, are believed to be suppressed under the conditions of the present invention because the effective instantaneous concentration and availability of living free chains is extremely small. In addition, stable free radical agents of the instant invention do not initiate monomer polymerization so that new chains are not initiated after an initial incubation period during which it is believed that all polymer chains are initiated at about the same time.

Propagating chains of the present invention are referred to as pseudoliving because the stable free radical agent adds to a propagating chain and the chain is temporarily, but reversibly, terminated, reference the aforementioned U.S. Pat. No. 5,322,912, the disclosure of which is incorporated by reference herein in its entirety. The term "protected" as used therein refers, for example, to the availability of chain radical species for selective rather than indiscriminate further reaction with monomer. An unmoderated free radical polymerization chain, that is, a free radical polymerization process without a stable free radical agent present, in contrast, has a reactive or "open" chain end throughout its lifetime which is inevitably typically irreversibly terminated on the order of seconds.

The present invention provides several specific advantages in embodiments as follows.

With the process of the present invention, polymer product polydispersities can be varied from between approximately 1.0 to approximately 2.0, or higher if desired, and preferably from about 1.0 to less than about 1.5 depending on the monomer/comonomer system selected and by varying the ratio of stable free radical agent to free radical initiator molar concentration. When the polymerization process conditions of the present invention are attempted with monomers without using the stable free radical (SFR) additive, considerably broader molecular weight resins are obtained for example, in excess of about 2 to 3, and conversion rates and extent are lower than those of the present invention in embodiments.

An oxo substituted nitroxide stable free radical agent may be used in the situation where acrylate or acrylate ester homopolymerization products are desired as disclosed in the aforementioned U.S. Copending application Ser. No. 08/242,490, and which reactions can be performed in a variety of reaction media including bulk, solution, aqueous or organic emulsion, suspension, phase transfer, or reactive extrusion.

During the reaction of monomer or mixtures of monomers to form polymers, the reaction time may be varied over about 1 to 60 hours, preferably between about 2 to 10 hours and optimally about 3 to 7 hours. The optimal reaction time may vary depending upon the temperature, the volume and scale of the reaction, the quantity and type of polymerization initiator and stable free radical agent selected, and relative monomer reactivity.

The polymerization reaction temperature is retained relatively constant throughout the heating step by providing an adjustable external heat source. This temperature is from about 60° C. to about 180° C., and preferably between 100° C. and 160° C. and optimally in embodiments 130° C. to 160° C. Reactions performed above 200° C. tend to result in a broadening of the polydispersity. A reaction volume may be selected for any size that enables simple adding, mixing, reacting, isolating, and formulating the product resins on an economic or convenient scale.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is about 0.001 to about 20 weight percent of the total weight of monomer to be polymerized and is determined by the desired molecular weight of the resin. As the initiator concentration is decreased relative to the weight or molar equivalents of monomer used, the molecular weight or the thermoplastic resin product increases.

Water soluble free radical initiators can be optionally employed in the processes of this invention and are those that are traditionally used in aqueous polymerization. Examples of water soluble free radical initiators are: persulfates; water soluble peroxides and hydroperoxides; more specifically, sodium, potassium and ammonium persulfate; peroxides such as hydrogen peroxide, t-butyl hydroperoxide, cumene hydroperoxide, paramenthane hydroperoxide; and peroxy carbonates. Other water soluble initiators of similar decomposition mechanism may be used if desired.

A preferred initiator is one which has a one-hour half-life at about 60° to 95° C. and a ten-hour half-life at about 50° to 80° C. Other peroxides, such as peresters and peracids having somewhat higher one-hour half-life/temperature relationships, may also be used if they are accompanied by a promoter compound such as tertiary amine. Such initiators are, for example: 2,4-dimethyl-2,5-dibenzyl peroxyhexane (138° C.), tert-butyl peroxybenzoate (125° C.), di-tert-butyl diperoxyphthalate (123° C.), methyl ethyl ketone peroxide (133° C.), dicumyl peroxide (135° C.) tert-butyl peroxycrotonate (118° C.), 2,2-bis-t-butyl(peroxybutane) (119° C.), tert-butylperoxy isopropyl carbonate (119° C.), 2,5-dimethyl-2,5-bis(benzoylperoxy)-hexane (118° C.), t-butyl peracetate (120° C.), di-t-butyldiperoxy-phthalate (123° C.), and the like. The figures in parentheses are the 1 hour half-life temperatures.

Still other initiators may also be employed if accompanied by a promoter compound in versions of this process, for example, 2,4-pentanedione peroxide (167° C.), di-t-butyl peroxide (149° C.), 2,5-dimethyl-2,5-di(t-butylperoxy)-hexyne (149° C.), 2,5-dimethyl-2,5-di(t-butylperoxy) hexyne (149° C.), 2,5-dimethyl-2,5-di(t-butylperoxy) hexane (138° C.), and the like.

Preferred initiator compounds are: t-butyl peroxy isobutyrate (120° C.); t-butyl peroxy 2-ethylhexanoate (95° C.); t-butyl pivalate (76° C.); and t-amyl peroxy 2-ethyl hexanoate (92° C.). Particularly preferred free radical initiators are azobisalkylnitrile and diaroyl peroxide compounds.

Water soluble monomer or monomers to be polymerized can be dissolved in water or aqueous mixtures of polar protic or aprotic organic solvents. The resultant aqueous solution usually contains a suitable water-soluble, free-radical generating initiator such as a peroxide or a persulfate, and the like, as defined above. The monomer or monomers are used in effective amounts relative to the free radical initiator, and stable free radical agent, as defined hereinafter.

The stable free radical agent used for polymerizing nonacrylate monomers or comonomers can be any stable free radical and includes nitroxide free radicals, for example, PROXYL (2,2 5,5-tetramethyl-1-pyrrolidinyloxy) and derivatives thereof, DOXYL (4,4-dimethyl-3-oxazolinyloxy) and derivatives thereof, and TEMPO (2,2,6,6-tetramethyl-1-piperidinyloxy) and derivatives thereof, and the like. These stable free radical agent materials are well known in the literature, for example G. Moad et. al., *Tetrahedron Letters,* 22, 1165 (1981) as free radical polymerization inhibitors. Other suitable nitroxides used for polymerizing nonacrylate monomers or comonomers are di-tert-butyl nitroxide and related di-tertiary alkyl substituted nitroxides. However, under the polymerization conditions of the present invention, the stable free radical agents function not as inhibitors but as moderators to harness the normally highly reactive and indiscriminate propagating intermediate free radical polymer chain species. The stable free radical agents are preferably soluble in the monomer phase, if more than a single phase is present initially, where predominantly all the polymerization of monomers occurs. Stable free radical agents which have limited monomer solubility are still useful, but may require a monomer miscible cosolvent or else these stable free radical compounds tend to result in less predictable polymerization processes. If the stable free radical agent separates out of the monomer phase to any great extent then the balance desired between the mole ratio of the stable free radical agent, free radical initiator, and propagating free radical polymer chain species may be upset.

The molar ratio of the stable free radical (SFR) agent to free radical initiator (INIT) residing in the monomer phase is from about 0.5 to 5.0, and preferably in the range from about 0.4 to 4.0. Although not desired to be limited by theory, in an embodiment, the molar ratio [SFR:INIT.] of stable free radical agent, for example, 4-oxoTEMPO, to free radical initiator, for example, AIBN, is about 2.0 and is believed to be important for success of the process. If the [SFR:INIT.] is too high then the reaction rate is noticeably inhibited. If the [SFR:INIT.] is too low then the reaction product has undesired increased polydispersity. It should be noted that when acrylic acid or acrylate ester compounds are polymerized to polyacrylate derivatives without the stable free radical agent of the present process, the product polymers isolated have polydispersities of 2.0 and above. A preferred stable free radical is the aforementioned TEMPO, and oxo-TEMPO when acrylate homopolymers are desired, and with benzoyl peroxide as a preferred initiator.

In embodiments, the molar ratio of monomer content to stable free radical agent to free radical initiator is from about 6.0:0.2:1.0 to about 10,000:2.5:1.0 and preferably in the range of about 125:2.0:1.0 to about 7,000:1.3:1.0.

Processes of the present invention, in embodiments, provide for selective low, intermediate, and high monomer to polymer conversion rates, or degrees of polymerization, and preferably, for example, of 90 percent by weight or greater.

The low weight average molecular weight resin products having narrow polydispersity properties, as is also the situation with intermediate and high molecular weight products of the present invention, may be obtained without the use of a chain transfer agent.

Processes of the present invention, in embodiments provide for relatively high weight average molecular weights, from weight average molecular weights ranging in size of from about 2,000 to about 500,000 while delivering narrow polydispersity products with high conversion as defined and illustrated herein.

The monomers and comonomers that can be used in the present invention are any monomer capable of undergoing a free radical polymerization and include but are not limited to styrene, substituted styrenes and derivatives thereof, for example, halogenated, hydroxylated, and methylated styrenes, acrylates, butadiene and any conjugated diene monomer sufficiently reactive under the specified stable free radical moderated polymerization reaction conditions to afford a stable free radical reaction adduct and subsequently high molecular weight polymer products, for example, polymers of n-butyl acrylate, acrylic acid, and the The polymerization reaction rate of the monomers may, in embodiments, be inhibited or accelerated and the reaction time influenced by the addition of a minor amount of a protic acid selected from the group consisting of inorganic acids, such as phosphoric, sulfuric, hydrochloric, and the like, and organic sulfonic and carboxylic acids such as, camphor sulfonic acid and benzoic acid. Although no definitive trend is presently evident, the added acid may have a profound or very little effect on the polymerization rate, depending upon a variety of reaction variables and conditions. Excessive addition of inorganic and organic acid beyond equimolar amounts compared to the stable free radical agent causes the resin polydispersity to broaden. In embodiments, the protic acid source may be in the form of an effective acid functional group contained in either the stable free radical agent or in the free radical initiator compound.

By cooling the polymerization reaction to below 60° to 80° C., the stable free radical moderated polymerization process is effectively quenched or terminated. Each new or subsequent addition of mixtures containing monomer, stable free radical, and initiator, accompanied by heating above about 100° to 120° provides a new pseudoliving polymeric species having a narrow molecular weight distribution and each new polymer species continues to grow independently of the other polymer species already established thereby providing the capability of forming well defined, narrow polydispersity, bimodal and multimodal polymer mixtures which may or may not be water soluble.

Alternatively, block copolymer resins may also be prepared whereby after each desired block has been formed a new monomer or monomers is added, without the addition of more initiator or stable free radical agent, to form a new block wherein each block component is well defined in length and has a narrow molecular weight distribution and having properties depending on the repeated sequence and the monomers chosen for incorporation, for example, the second or subsequently added blocks may or may not be water soluble. Monomers added subsequent to the formation of the first formed thermoplastic resin may be water soluble or water insoluble. Judicious selection of the water solubility properties of added monomers and the resulting polymeric segment enables convenient synthetic routes to block and multiblock copolymers with narrow polydispersities that are useful, for example, as reactive emulsifiers or stabilizing surfactants, resin compatibilizers, viscosity modifies, and high efficiency emulsifiers.

The polymeric products of the present invention may be optionally crosslinked with, for example, known crosslinking, coupling, or curing agents such as divinyl benzene and the like, either in situ or in a separate post polymerization process step.

Additional optional known additives may be used in the polymerization reactions which do not interfere with the objects of the invention and which may provide additional performance enhancements to the polymerization and particle forming reactions. for example, minor amounts of acidic polymerization promoter compounds such as, camphorsulfonic, benzoic, phosphoric, phosphoric acid esters, phosphonic acids and acid esters, and the like acids, and additives to the resulting product, for example, colorants, lubricants, release or transfer agents, surfactants, stabilizers, antifoams. antioxidants. and the like.

Ink and dry toner formulation resins possessing a discrete mixture of monomodal resins, that is a well defined multimodal molecular weight distribution, may in embodiments thereof provide several advantages, particularly for electrophotographic and ink jettable type fusible toner compositions such as: melt rheology properties including improved flow and elasticity; and improved performance properties such as triboelectrification charging of particles, admix rates, improved ink jetting performance as measured by latency and recoverability, and shelf life stabilities.

Figure 2:
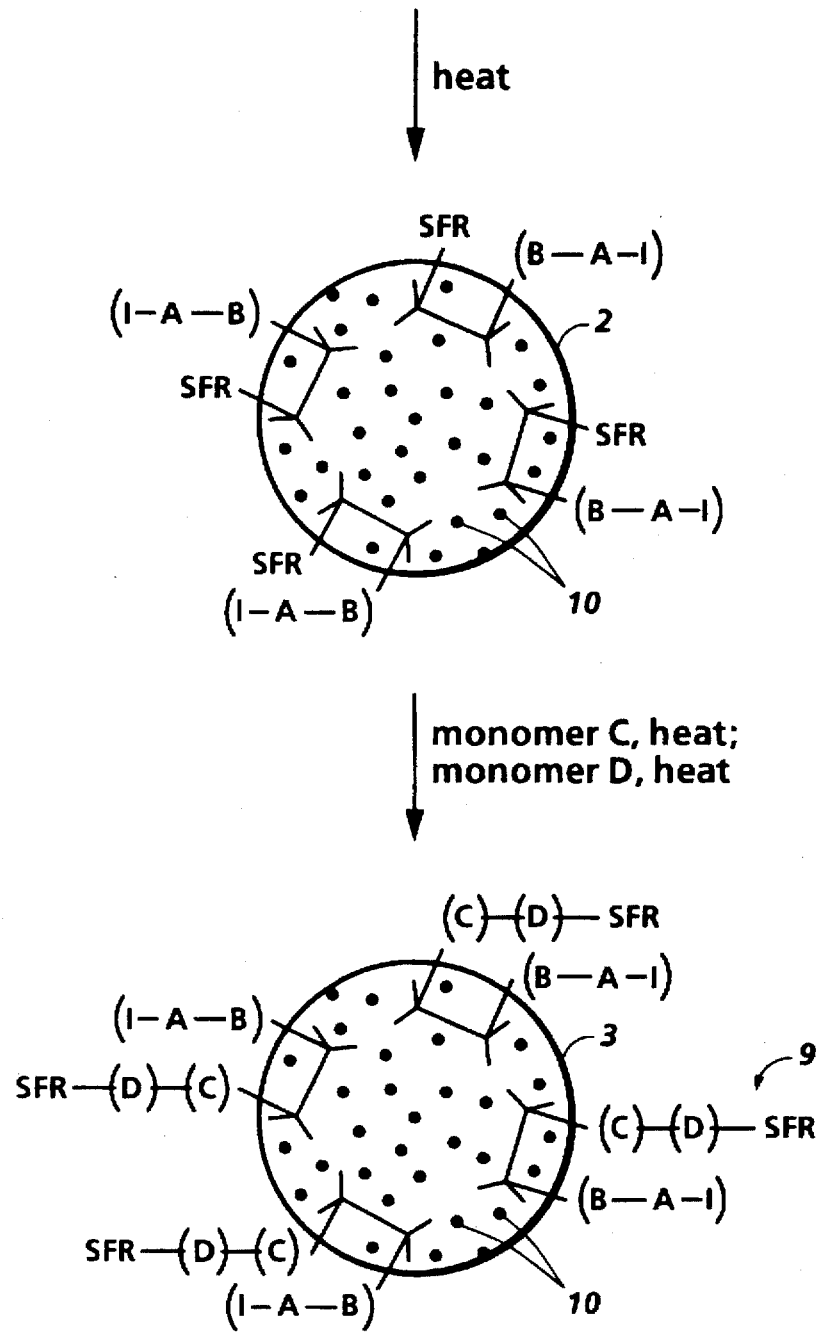
FIG. 2 illustrates an exemplary scheme for preparing stabilized resin colored particles of the present invention.

Referring to the Figures, toner compositions can be prepared by a number of known methods, such as admixing and heating the aforementioned reactive emulsifier compounds of the formula (I—A—B)—SFR with resin particles 1 having free radical reactive double bonds 5 on the surface thereof and optional colorants, reference FIG. 1. Free radical reactive double bonds include for example, double bonds which bear substituents selected from the group, but not limited to, hydrogen, alkyl, aryl, alkylaryl, carbonyl, olefinic and halides. The resulting stabilized resin particles 2 wherein the aforementioned double bonds 5, have reacted with the reactive emulsifier compounds, are converted to saturated bonds 6 by the free radical addition of reactive emulsifier fragments 7 and 8. The particles 2 can be further surface modified by heating the particles to above about 100° to 120° C., when the substituents on the saturated bond bearing the stable free radical (SFR) group are selected from the group, aryl, alkylaryl, carbonyl, olefinic and halides, preferably in a non-dissolving liquid suspension, with an additional free radical reactive monomer monomers, sequentially or as mixtures, to afford stabilized resin particles 3 with supplemental appendages 9 derived, for example, from monomers C and D as illustrated in FIGS. 1 and 2. When the additional monomers are added sequentially, (C)-(D) block copolymer appendages result. When the additional monomers are added as a mixture, random copolymers of the form (C-D) result and which randomness is governed by the relative reactivity ratios of the respective monomers. Alternatively, in embodiments, the reactive emulsifiers (I—A—B)—SFR may be reacted directly with free radical reactive monomer or monomers, optionally in the presence of a colorant 10, reference FIG. 2, and optionally with a stabilized colorant adduct or particle of the present invention, as illustrated in FIG. 3 wherein 10 is the colorant or pigment such as carbon black, and heat refers, in embodiments, to 120° to 160° C. The resulting stabilized pigment particles and stabilized resin particles can be water or oil dispersible depending upon the selection and constitution of the reactive stabilizer compounds affixed to the particles.

Furthermore, in embodiments there are provided processes for preparing stabilized pigment particles by heating suitably reactive pigment particles with a stabilizing quantity of the reactive emulsifier. The resulting stabilized pigment particles may be further admixed and heated with free radical reactive monomer and optional resin to polymerize the monomer onto the pigment particle which further compatibilizes and dispenses the pigment particles with incipient resin and resin particles, and thereby leads to colorized resin particles with highly uniform pigment particle dispersions and color quality properties, reference FIG. 3.

In other embodiments, stabilized resin and pigment particles with stable free radical (SFR) surface groups may be heated in the presence of a protic acid in the absence of monomer, or alternatively by photolysis, to effectively cleave the —SFR surface groups and thereby provide stabilized resin and pigment particles which are substantially free of surface —SFR groups. The aforementioned acidic treatment affords a simple means for introducing enhanced thermal and chemical stability to the stabilized resin and pigment particles by removing the thermally and photochemically lablie latent free radical functionality from the particle surface.

Ink compositions can be prepared by a number of known methods, such as admixing and heating polymer suspensions obtained with the processes of the present invention such as water soluble styrene sulfonates with pigment particles such as magnetite, carbon black, surface treated carbon blacks such as ACETYLENE BLACK® from Chevron Oil and CONDUTEX SC, and mixtures thereof, and cyan, yellow, magenta, green, brown, red, or mixtures thereof in an attritor device, such as the 01 Attritor available from Union Process and removing the formed ink composition from the device. After cooling, the ink composition is optionally subjected to filtration, for example, through a 0.8 micron filter for the purpose of achieving pigment dispersions with a volume median diameter of less than about 0.10 microns, and preferably of from about 0.03 to about 0.08 micron, which diameters are determined by a HORIBA particle sizer.

The colorant or pigment particles include magnetite especially MAPICO BLACK, carbon black especially REGAL 330®, or mixtures thereof, and cyan, yellow, magenta, green, brown, red, or mixtures thereof in amounts of from about 0.5 to about 15 weight percent of the total monomer and resin used. Internal charge enhancing additives may be added to the resin and liquid vehicle mixture in amounts of from about 0.5 percent to about 5 percent by weight preferably 1 to 3 of the total monomer and resin used. Subsequent to cooling, the toner composition, if desired but not necessary, is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. The toner compositions can optionally be classified if desired utilizing, for example, a Donaldson Model B classifier for the purpose of removing toner fines, that is toner particles less than about 4 microns volume median diameter, for use in, for example, dry toner marking applications.

Illustrative examples of suitable toner and ink resins and co-resins selected for the toner and ink developer compositions of the present invention include polyamides, styrene acrylates, styrene methacrylates, styrene butadienes, vinyl resins, including homopolymers and copolymers of two or more vinyl monomers; vinyl monomers include styrene, p-methyl styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins for use in admixture with other resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In concentrated liquid toner and ink compositions, the marking particles are present in a sufficient but effective amount, for example, from about 10 to about 90 weight percent. Thus, for example, when 1 percent by weight of the charge enhancing additive is present, and 10 percent by weight of pigment or colorant, such as carbon black, is contained therein, about 89 percent by weight of resin is selected. Also, the charge enhancing additive may be optionally coated on the pigment or pigmented resin particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles may be selected.

When the pigment particles are comprised of magnetites, thereby enabling single component toners in some instances, which magnetites are a mixture of iron oxides (FeO—$Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Example of these additives include colloidal silicas, such as AEROSIL®, metal metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to about 10 and preferably 0.1 to about 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may, in embodiments, function as fuser roll release agents.

In embodiments of the present invention there are provided ink jettable toner compositions and imaging processes thereof wherein the ink and resulting developed images have a latency of about 5 seconds to about 2,000 seconds, and a recoverability of about 50 seconds to about 2,000 seconds, where latency is defined as the time that a printhead can maintain transit times (between the printhead and the paper) of below 100 microseconds and where recoverability is defined as the time that a printhead can regain transit times below 100 microseconds. The resulting developed and fused images, in embodiments, possess excellent mid frequency line edge noise known as MFLEN, also referred to as line raggedness, of about 1 to about 10, and preferably from about 1 to about 3.

Encompassed within the scope of the present invention are colored toner particles and ink particle compositions comprising water soluble dispersants, colored particles, latency enhancing solvents, and the like additives, which are useful as developer compositions, liquid ink developers, and particularly ink jet inks, comprised of stabilized toner resin particles, optionally carrier particles, charge enhancing additives illustrated herein, and as pigments or colorants red, blue, green, brown, magenta, cyan and/or yellow particles, as well as mixtures thereof, which may, in embodiments, be sterically stabilized or resin compatibilized pigment particles as illustrated herein. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of dry developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner and ink compositions of the present invention can be prepared by a number of known methods as indicated herein including direct isolation of the aforementioned in situ particles by known means, extrusion melt blending the stabilized toner resin particles with conventional colorant compounds, optionally the stabilized pigment particles or colorants, and optionally a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions may be optionally jetted and classified subsequent to preparation to, although not believed to be necessary for the aforementioned reasons, enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples are being supplied to further define various species of the present invention, it being noted that these Examples are intended to illustrate and not limit the scope of the present invention. Parts and percentages are by weight unless otherwise indicated.

EXAMPLE I

Preparation of Polystyrene Sulfonates/Polystyrene Block Copolymer Containing Stable Free Radical Reactive Group To an aqueous solution of ethylene glycol (97.5%) was added sodium styrenesulfonate monomer (100 g, 0.486 mol), TEMPO (19.6 g, 0.126 mol), and sodium bisulfate (8.1 g). This mixture was heated in an oil bath under argon, at 50° C. until the solids dissolved, and then potassium persulphate (16.2 g, 0.6 mol) was added. The solution was maintained at this temperature for 2.5 hours, and then heated to reflux (120° C.) for 4.5 hours. After the solution was cooled to about 80° C., it was then added to a solution of acetone/methanol (1.4 L, 7:3), resulting in a paste. The supernatent was decanted off and 1 L of acetone added. This mixture was stirred for 10 minutes and the resulting precipitate was filtered, washed with acetone, hexane, and then dried to give 83.8 g of polymer. Molecular weight of the poly(styrene sulfonate)-TFMPO intermediate polymer as determined on a Shimadzu gel permeation chromatograph (aqueous sodium nitrate as eluant) was $M_w$=8,722 with a polydispersity of 1.35.

To ethylene glycol (40 g) was added 10 g of the above mentioned sodium poly(styrene sulfonate), and styrene monomer (10 g). This solution was heated to 130° C. and maintained at that temperature for 6 hours. The solution was cooled and added to acetone (350 mL). The resulting precipitate was filtered, washed twice with acetone and twice with hexane. After drying, 13 g of poly(sodium styrenesulfonate-b-styrene)-TEMPO copolymer with a $M_w$=11,250, and P.D.=1.19 was obtained for a styrene monomer to copolymer weight conversion of about 65 percent.

EXAMPLE II

Preparation of Colored Resin Particle Emulsions

To 2 g of the block copolymer prepared in Example I was added water (100 mL), styrene monomer (18 g) and a blue oil soluble dye (5 g, BASF LURAFIX BLUE) in a PARR reactor. This two phase system was vigorously stirred and heated to 130° C. The mixture was maintained at 120° C. to 130° C. for 5 hours, cooled and then filtered through a 0.7 micron filter to provide a flitrate containing a blue colored resin particle emulsion useful as a liquid ink jettable toner.

EXAMPLE III

Evaluation of Ink Jettable Toners

The filtered emulsion of Example II was evaluated as a working ink in a Hewlett-Packard thermal ink jet (TIJ) printer Model HP500C from Hewlett-Packard Corp. Images were jetted and then fused on a refuser at 150° C. The optical density (O.D.), water fastness, and wet smear of the resultant images were measured using a densitometer both before (no heat) and after fusing (heat 150° C.). The results are shown in the accompanying table.

The optical density results indicated that after heating and fusing the images to the receiver, the fused images are highly resistant to water and wet smear and are comparable to the water fastness and wet smear properties of conventional fused dry toner xerographic images.

| Jetted Toner Evaluation | O.D. (No Heat) | O.D. (Heat 150° C.) |
|---|---|---|
| Image direct from HP printer | 0.54 | 0.54 |
| Waterfastness-Image exposed to $H_2O$ | 0.25 | 0.46 |
| Image wet smear | 0.34 | 0.52 |

EXAMPLE IV

Preparation of Stabilized Carbon Black Suspensions

The poly(styrene sulfonate)-TEMPO first formed intermediate polymer of Example I, ($M_w$ 8,722, polydispersity 1.35) 4 g, was added to an attritor containing 2 kg of 440° C. stainless steel shot and 220 g of 97% aqueous ethylene glycol with stirring. The attritor was heated to 100° C. with an oil heated jacketed attritor. Carbon black (20 g, RAVEN 5750 from Columbia Chemicals) was added over a 1 minute period and heating continued to 135° C. Attrition was continued for 7 hours, then cooled to 25° C. and resultant stabilized carbon black pigment paste was suctioned off from the shot. Residue from the shot was recovered by washing the shot twice with 250 g portions of $H_2O$. The combined aqueous dispersions were centrifuged for 40 minutes at 4,000 RPM. The supernatent was discarded. The sediment was redispersed in $H_2O$ (350 g), then sonicated for 20 minutes. The dispersion was centrifuged a second time (20 min at 4,000 RPM) and the supernatent was filtered through a 0.7 micron filter, then rinsed with about 5 ml of $H_2O$ to complete the transfer. The flitrate afforded 354 g with a solids content of 18.1 g comprised of stabilized carbon black particles suspended in water. This passivated and stabilized carbon black particle dispersion in $H_2O$ was used as a stock suspension for preparing ink formulations.

Aqueous Ink Jet Toner Formulation

To 75 g of the above stock suspension was added 20 g ethylene glycol, 3 g of isopropyl alcohol and 2 g $H_2O$. This ink formulation afforded a final carbon black loading of 4.5% by weight. This ink formulation was tested on an ink jet print head simulator, whereby the jetted drops were observed in flight with opto-electronic instrumentation, and relative drop sizes, velocities, and other drop characteristics were measured and recorded. The measured latency was greater than 1,000 seconds using a 300 s.p.i. simulated printhead configuration.

EXAMPLE V

Preparation of High Weight Average Molecular Weight Poly(styrenesulfonate)-TEMPO Terminated Stabilizer Compound (PSS-T)

To a 100 mL round bottom flask was added styrene sulfonate sodium salt monomer (10 g, 0.0486 mole), TEMPO stable free radical (1.52 g, 0.00972 mole), NaHSO$_3$ free radical initiator (0.65 g) and benzoic acid as a rate accelerant (300 mg). To this was added 31 g of ethylene glycol and 8 g of water. This solution was heated to 70° C. for 1 hour and then heated to reflux for 1.5 hours. Next 6 mL (about 10% by volume) of the aforementioned reaction solution containing primarily poly(styrenesulfonate)-TEMPO terminated reactive stabilizer compound of intermediate molecular weight was added to a second solution of styrene sulfonate sodium salt monomer (100 g, 0.486 mole) solution contained in an ethylene glycol/water (320 g/80 g) mixture. This mixture was heated at reflux for 2.5 hours and then poured into a mixture of methanol/acetone to give a polymer product after drying of 88 g in an 87% yield. The PSS-T polymer product was analyzed and found to have the following molecular weight properties: $M_w$=216,690; $M_n$=162,259; and polydispersity ($M_w/M_n$) of 1.34.

EXAMPLE VI

When Example V is repeated with the exception that only 1 ml (less than 2% by volume) of the first formed reaction mixture containing the intermediate molecular weight TEMPO terminated stabilizer compound is added to the second solution of monomer wherein a final PSS-T polymer product with an estimated weight average molecular weight in excess of about 500,000 and a polydispersity of less than 1.5, that is about 1.4 is obtained.

EXAMPLE VII

Example V was repeated with the exception that only 0.1 mL (less than 0.2% by volume) of the first formed reaction mixture containing the intermediate molecular weight TEMPO terminated stabilizer compound was added to the second solution of monomer with the result that the final PSS-T polymer product had a weight average molecular weight of about 700,000 and a polydispersity in excess of 2.0.

EXAMPLE VIII

Preparation of Uncolored Resin Particle Emulsions

To 1.0 g of a reactive block copolymer poly(styrenesulfonate-b-styrene)-TEMPO was added water (100 mL), styrene (12.1 g) and dodecylbenzylsulfonic acid (0.30 g) in a PARR reactor. The resultant two phase system was emulsified with a high shear mixer for 1 minute. The PARR reaction vessel was purged with nitrogen, sealed, and then heated to 125° C. over 45 minutes. This temperature was maintained for 6 hours with rapid stirring. The reactor was cooled and the emulsion was discharged. The yield for the reaction was 59 weight percent solids based on the weight of the reactants. The particle size as determined by SEM was about 10 to about 100 nm. The emulsion at room temperature showed no settling, phase separation, or agglomeration over an extended period of time.

EXAMPLE IX

Magnetic Toner Preparation and Evaluation

The amphipatic diblock polymer resin (74 weight percent of the total mixture) obtained by the stable free radical polymerization processes of Example I may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The minimum fix and hot offset temperatures of stable free radical polymerization polymers having narrow polydispersities as toners are expected to be improved over toners prepared from resins synthesized by a free radical polymerization process without a stable free radical agent present affording broad polydispersities. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer.

Images may also be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference the aforementioned U.S. Pat. No. 4,265,990; images for toner compositions prepared from the copolymers derived from for example, Example I of the present invention provide excellent image quality with no background deposits and of high resolution over an extended number of imaging cycles exceeding, it is believed, about 75,000 imaging cycles.

Other toner compositions may be readily prepared by conventional means from the polymer and copolymer resins and pigmented resin particles of the present invention including colored toners, single component toners, multicomponent toners, toners containing special performance additives, and the like.

The stable free radical agent moderated polymeric, copolymeric, and particle stabilization polymerization processes of the present invention may be applied to a wide range of organic monomers to provide novel materials such as: stabilized pigment particles; suspension stabilized toner resin materials with desirable electrophotographic properties; and stabilized liquid marking particles for use in ink liquid jet and liquid immersion development applications. The reactive emulsifier block copolymers of the present invention also have application as dispersants for photoreceptor pigments. The multimodal resins have application to low melt resins and certain monomodal resins of the present invention may be used to modify the surface of carbon black and pigment particles to make the pigment particles more miscible with a host polymer resin or dispersing medium. Narrow molecular weight copolymeric resins of the present invention containing polar and acidic functional groups such as poly(styrene-b-n-butyl acrylate) and poly(acrylic acid-b-butyl acrylate), poly(styrene-b-styrene sulfonate), mixtures thereof, and the like, find application as improved toner resins and ink jet formulations for general application and particularly for detoning or deinking applications which may be achieved, for example, by heating at elevated temperatures in aqueous alkali solutions.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A method of imaging comprising:
   jetting with a liquid jet an ink jettable toner composition comprised of a liquid carrier vehicle and stabilized core particles comprised of resin, colorant, and a stabilizer component which is covalently bonded to the core particles, in a predetermined pattern onto a receiving member to form an image; and
   fixing the image to a receiver by heating or irradiating the image and/or the receiver at from about 40° to about 150° C.

2. A method in accordance with claim 1 wherein there results high quality images with an optical density of from about 1.0 to about 1.4.

3. A method in accordance with claim 2 wherein the resulting high quality images have edge raggedness or MFLEN value of about 1 to about 10.

4. A method in accordance with claim 2 wherein the resulting high quality images have a resolution of at least about 600 spi when jetted from an ink jet print head.

5. A method in accordance with claim 2 wherein the resulting high quality images do not wet smear on contact with water and mechanical abrasion.

6. A method in accordance with claim 1 wherein the ink composition has a latency of about 5 seconds to about 2,000 seconds.

7. A method in accordance with claim 1 wherein the ink composition composition has a recoverability of about 50 seconds to about 2,000 seconds.

8. A method in accordance with claim 1 wherein the heating or fixing of the image is accomplished at a temperature of about 25° C. to about 90° C.

9. A method in accordance with claim 1 wherein there results essentially no koagation on heating elements of the jetting means after continuously jetting of the ink jettable toner composition from about $10^6$ to $10^9$ drops at a temperature of about 200° C. to about 400° C.

10. A toner composition comprising a liquid carrier vehicle, and marking particles comprised of core resin, a colorant, additives, and at least one stable free radical reactive polymeric stabilizer compound, wherein said stabilizer compound is comprised of a stabilizing arm or arms and at least one stable free radical agent(SFR), wherein said stabilizer arm or arms are covalently bonded to the surface of said particles and said stable free radical agent (SFR) is covalently bonded to the surface of said particles or to said stabilizer arm or arms.

11. A composition in accordance with claim 10 wherein the liquid carrier vehicle is selected from the group consisting of water, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, ether derivatives, hydroxy ether compounds and derivatives thereof, amino alcohols, ketones, and mixtures thereof.

12. A composition in accordance with claim 10 wherein the marking particles are sterically and electrostatically stabilized by the stable free radical reactive stabilizer compound covalently bonded thereto.

13. A composition in accordance with claim 10 wherein the marking particles are thermally stable in a liquid dispersion and in a liquid jet over a temperature range from about 5° C. to about 200° C.

14. A composition in accordance with claim 10 wherein the marking particles are comprised of emulsion or suspension stabilized polymerized resin particles which are thermally stable up to about 200° C. when dispersed in the liquid carrier vehicle.

15. A composition in accordance with claim 10 which is humectant free.

16. A composition in accordance with claim 10 wherein the core resin or resins have a weight average molecular weight ($M_w$) of about 10,000 to about 200,000, a number average molecular weight ($M_n$) of about 9,000 to about 180,000, and a polydispersity of about 1.0 to about 2.0.

17. A composition in accordance with claim 10 wherein the marking particles have a volume average diameter of about 10 nm to about 100 nm.

* * * * *